United States Patent
Isaksson (10) Patent No.: US 10,166,552 B2
(45) Date of Patent: Jan. 1, 2019

(54) VALVE FOR DRAINING OFF GAS FROM A CENTRIFUGAL SEPARATOR

(71) Applicant: ALFA LAVAL CORPORATE AB, Lund (SE)

(72) Inventor: Roland Isaksson, Ribeirao Preto (BR)

(73) Assignee: ALFA LAVAL CORPORATE AB, Lund (SE)

( * ) Notice: Subject to any disclaimer, the term of this patent is extended or adjusted under 35 U.S.C. 154(b) by 341 days.

(21) Appl. No.: 15/102,154

(22) PCT Filed: Dec. 4, 2014

(86) PCT No.: PCT/EP2014/076615
§ 371 (c)(1),
(2) Date: Jun. 6, 2016

(87) PCT Pub. No.: WO2015/086435
PCT Pub. Date: Jun. 18, 2015

(65) Prior Publication Data
US 2016/0310971 A1    Oct. 27, 2016

(30) Foreign Application Priority Data
Dec. 11, 2013 (EP) .................................... 13196651

(51) Int. Cl.
*F16K 1/14* (2006.01)
*F16K 1/36* (2006.01)
(Continued)

(52) U.S. Cl.
CPC .............. *B04B 15/08* (2013.01); *B04B 11/06* (2013.01); *F16K 1/14* (2013.01); *F16K 1/36* (2013.01);
(Continued)

(58) Field of Classification Search
CPC .... B04B 1/10; B04B 1/12; B04B 1/14; B04B 1/16; B04B 1/18; B04B 7/14;
(Continued)

(56) References Cited

U.S. PATENT DOCUMENTS 2,551,041 A * 5/1951 Nielsen ...................... B04B 1/18
                                                          137/58
2,985,361 A    5/1961 Smith
(Continued)

FOREIGN PATENT DOCUMENTS

CN     101827562 A    9/2010
DE        610305       3/1935
(Continued)

OTHER PUBLICATIONS

Full machine translation of RU-67479-U1, which was published on Oct. 27, 2007.
(Continued)

*Primary Examiner* — Charles Cooley
(74) *Attorney, Agent, or Firm* — Birch, Stewart, Kolasch & Birch, LLP (57) ABSTRACT

A valve for draining off gas from a centrifugal separator includes a valve body having a central axis around which the valve may be rotated; a cavity arranged at a radial distance from the central axis and including a valve ball and a valve seat; at least one drain channel extending from the valve seat of the cavity to the outside of the valve body; and at least one gas intake extending from the outside of the valve body to the cavity. The valve ball is in a relaxed state within the cavity and thereby arranged to float on a liquid surface present within the cavity, and thereby being movable in the cavity in the radial direction from rotational axis from a closed position, in which the ball rests against the valve seat and thereby blocking gas in the cavity from entering the at
(Continued)

least one drain channel, to an open position, in which the valve ball is at a longer radial distance from the axis compared to the closed position, and in which open position the valve ball does not block the valve seat and thereby allowing gas in the cavity to drain from the valve via the drain channel. A centrifugal separator and a method for draining gas from the inlet of a centrifugal use the valve.

20 Claims, 3 Drawing Sheets (51) Int. Cl.
| | | |
|---|---|---|
| B04B 11/06 | (2006.01) | |
| B04B 15/08 | (2006.01) | |
| F16K 15/04 | (2006.01) | |
| F16K 15/18 | (2006.01) | |
| F16K 27/02 | (2006.01) | |
| F16K 31/22 | (2006.01) | |

(52) U.S. Cl.
CPC ............ *F16K 15/04* (2013.01); *F16K 15/183* (2013.01); *F16K 27/0245* (2013.01); *F16K 31/22* (2013.01)

(58) Field of Classification Search
CPC ......... B04B 11/04; B04B 15/08; B04B 11/06; F16K 15/183; F16K 15/04; F16K 27/0245; F16K 1/14; F16K 31/22; F16K 1/36
See application file for complete search history.

(56) References Cited

U.S. PATENT DOCUMENTS

| | | | | |
|---|---|---|---|---|
| 3,095,371 | A | | 6/1963 | Fitzsimmons |
| 3,213,879 | A | * | 10/1965 | Thompson .............. B04B 11/02 137/527.4 |
| 3,765,601 | A | | 10/1973 | Gulley |
| 3,930,609 | A | | 1/1976 | Nelson |
| 4,645,485 | A | * | 2/1987 | Niemerg ................... B04B 1/14 251/20 |
| 5,618,409 | A | * | 4/1997 | Kreill ........................ B04B 1/14 210/149 |
| 2006/0229185 | A1 | * | 10/2006 | Herman ................... B04B 5/005 494/49 |
| 2010/0204032 | A1 | | 8/2010 | Pregenzer et al. |
| 2015/0190817 | A1 | * | 7/2015 | Pieralisi ..................... B04B 1/14 494/48 |
| 2016/0016182 | A1 | * | 1/2016 | Bodelson .................. B04B 1/14 494/56 |
| 2016/0310971 | A1 | * | 10/2016 | Isaksson ................. B04B 11/06 |

FOREIGN PATENT DOCUMENTS

| | | |
|---|---|---|
| EP | 0 070 159 B1 | 11/1987 |
| GB | 373560 A | 5/1932 |

OTHER PUBLICATIONS

Russian Notice of Allowance issued in Russian Application No. 2016125871 dated Sep. 26, 2017, together with an English translation.

* cited by examiner

VALVE FOR DRAINING OFF GAS FROM A CENTRIFUGAL SEPARATOR

FIELD OF THE INVENTION

The present invention relates to the field of centrifugal separators, and especially to the field of venting off gas from centrifugal separators.

BACKGROUND OF THE INVENTION

Centrifugal separators with a sealed inlet usually need to drain off air or other gas from the inlet in order to enable free passage of the incoming liquid mixture that is to be separated. This may be especially noticeable when the inlet flow is introduced in a separator that is already running at its operational speed. The first amount of liquid may form a "stench trap" in the bowl and thereby stopping the gas trapped at the inlet from passing through the bowl. Trapped gas may in turn obstruct, partly or even totally, the liquid flow through the separator. This may of course be a setback for sealed separators, but trapped gas may sometimes be forced through the separator by increasing the inlet pressure temporarily. Since this may not always be possible, some separators may be equipped with a small passage that allows blocking gas to escape, internally in the separator, from the inlet to the outlet and thereby allowing inlet liquid to flow freely at the inlet. The drawback may be that not only gas may pass through such a passage, but also unseparated liquid that is then fed directly to the clean and separated liquid at the outlet. At low flow rates and with high demands of separation efficiency, this may not be acceptable and low flow rates are usually a requirement for sufficient separation.

U.S. Pat. No. 3,095,371 describes a centrifuge having a gas vent. The gas vent valve is a complex design in which a cylindrical valve body is arranged to open and close a valve seat under the centrifugal pressure of the operating separator.

DE 610305 discloses a separator having an arrangement for venting gas. It utilizes a spring-loaded sphere which is balanced by the inlet pressure of the separator.

There is however a need in the art for improved and simplified methods of for draining off gas from a centrifugal separator.

SUMMARY OF THE INVENTION

A main object of the present invention is to provide means that at least alleviates some of the above-mentioned problems.

A further object of the present invention is to provide a valve that in an efficient way drains gas from the inlet of a centrifugal separator.

As a first aspect of the invention, there is provided a valve for draining off gas from a centrifugal separator, the valve comprising
 a valve body having a central axis (C) around which the valve may be rotated;
 a cavity arranged at a radial distance from the central axis (C) and comprising a valve ball and a valve seat;
 at least one drain channel extending from the valve seat of the cavity to the outside of the valve body; and
 at least one gas intake extending from the outside of the valve body to the cavity; and wherein
 further the valve ball is in a relaxed state within said cavity and thereby arranged to float on a liquid surface present within the cavity, and thereby being movable in the cavity in the radial direction from rotational axis (C) from a closed position, in which the ball rests against the valve seat and thereby blocking gas in the cavity from entering the at least one drain channel, to an open position, in which the valve ball is at a longer radial distance from axis (C) compared to the closed position, and in which open position the valve ball does not block the valve seat and thereby allowing gas in the cavity to drain from the valve via the drain channel A valve refers to a device that is able to regulate the flow of a fluid by opening, closing, or partially obstructing various passageways. A centrifugal separator refers to a separator that utilizes centrifugal forces in order to separate components from an inlet mixture, such as a liquid. The centrifugal separator may for example be mechanically hermetically sealed at the inlet for the mixture that is to be separated.

A valve body refers to the structure of the complete valve. The central axis of rotation (C) thus refers to a central axis of the valve body. The central axis C may for example extend through the mass centre of the valve body.

A cavity refers to a space within the valve body. The cavity is arranged at a radial distance from central axis C. For example, the cavity may be arranged in the valve body substantially between the central axis C and the outside of the valve body. The cavity comprises a valve ball, functioning as the valve, and a valve seat, upon which the valve ball rests when the valve is in a closed position.

The ball is in a relaxed state within the cavity, i.e. it is not e.g. spring-loaded. The ball may thus move freely within the cavity when there is no liquid present in the cavity. The ball is thus arranged and capable of moving in the radial direction within the cavity, such as moving on the surface of a liquid present in the cavity during operation of the separator. The liquid is thus a liquid subjected to the centrifugal forces of the separator, e.g. the liquid that is to be separated.

It is to be understood that the valve ball does not have to be a perfect sphere. Consequently, the valve ball may be substantially sphere-shaped. Thus, in the most basic design, the valve is realized by a ball shaped valve that is capable of floating on a liquid surface, and by moving in the radial direction within the cavity either closes the drain channel by resting against the valve seat, or opens the drain channel when moving radially from the valve seat. The valve seat may thus be round shaped. The ball has thus a suitable diameter such that it fits and is movable within the cavity, but still is able to close the drain channel as it rests against the valve seat.

A drain channel is arranged from the valve seat to the outside of the valve body. Thus, the drain channel is where any gas escapes from the valve body when the valve is open. Further, the gas intake is a channel through which gas may travel from the outside of the valve body to the cavity, and thus to the valve seat. The valve may comprise more than one gas intake, such as two, three or more gas intakes.

As discussed above, when the valve is in the open position, the valve ball is further away in the radial direction from axis c as compared to the closed position, in which the ball rests against the valve seat. In the open position, gas is allowed to flow via the gas intake to the cavity and further through the drain channel. In the closed position, any gas flowing in the gas intake is prevented by the ball from entering the drain channel via the valve seat.

That the ball moves in the radial direction means that the ball moves substantially in the radial direction. The cavity may be shaped such that the ball move in a direction described by several vectors, in which one of the vectors is a vector in the radial direction from axis C. For example, the ball may move in a direction that forms an angle with the central axis C, but comparing the position of the ball in the closed position and the open position, the ball is at a radial position that is further away from central axis C in the opened position as compared to the closed position.

The cavity may thus be arranged such that the valve seat leading to the drain channel is at a radial distance from the central axis C. Tis distance may for example be half of the radial distance from the central axis C to the outside of the valve body. The radial distance may also be substantially the same as the diameter of the valve ball.

The first aspect of the invention is based on introducing a ball-shaped float within a valve, and that this ball-shaped float is arranged to float on a liquid surface present within the valve, thereby opening and closing the valve.

If the valve is introduced at the inlet of a centrifugal separator, the float will sense the presence of gas and free the drain passage. When the gas has been drained off, the float is capable of moving in the radial direction and on the surface of a liquid introduced in the separator, and thereby close the passage. This means that liquid is stopped from escaping through the drain passage. When the amount of gas increases around the float in the valve, the float is capable of moving away from the valve seat due to the lowered liquid level and centrifugal forces present in the rotating separator. The valve may thus open again to release any excess gas.

The valve according first aspect of the invention is advantageous in that it introduces a self-regulating valve that is capable of draining gas from a separator inlet. Thus, the valve of the present invention does not need to use a spring loaded device as disclosed by the prior art. Further, the valve solves problems related to leakage of unseparated liquid in a passage from the inlet to for example the outlet of the separator. In other words, the valve may efficiently stop any unseparated liquid from passing directly to e.g. the outlet and instead only gas is allowed to pass.

In embodiments of the first aspect of the invention, the valve ball is of a material that is capable of floating on the surface of a liquid, such as an aqueous liquid.

In embodiments of the first aspect of the invention, the valve ball is of an elastic material.

With an elastic valve ball, the valve may seal well enough although the sealing surfaces of the valve seat and the valve ball are not perfect due to the buoyancy of the elastic ball.

In embodiments of the first aspect of the invention, the valve body is a single piece. The single piece may for example be an extruded piece. Thus, the valve body may be of a polymeric material. However, the valve body may also be of a metallic material, such as stainless steel.

In embodiments of the first aspect, the drain channel comprises a first channel portion extending substantially in the radial direction from central axis (C) from the valve seat, and a second channel portion extending from the first channel portion to the outside of the valve body.

Thus, the drain channel may extend in several directions. This may be advantageous in that the gas may easily enter the first portion from the cavity of the valve body, and the second portion may then be used for leading the gas out from the valve body in any suitable direction.

As an example, the second portion may be substantially aligned with the central axis (C) of the valve body.

Thus, the gas may be drained off from the cavity by a first portion extending from the cavity to the central axis, and via a second portion that extends in a direction that is aligned with the central axis. The gas may thus be led from the valve body from the centre.

In embodiments of the first aspect, the valve further comprises holding means for retaining the ball within the cavity.

The holding means may for example be a pin. The holding means may function so as to retain the valve ball within the cavity. The holding means may thus allow radial movements of the valve ball from axis C within the cavity, but restrict movements in for example the axial direction, i.e. a direction that is perpendicular to the radial direction.

In embodiments of the first aspect, the valve comprises a dome-shaped outer surface, and the at least one fluid intake extend from the dome-shaped outer surface to the cavity.

Thus, the valve body may comprise the dome-shaped outer surface.

A dome-shaped outer surface refers to a shape that resembles a half of a sphere. Thus, the outer surface may have one part that is rounded. This allows the valve to be mounted within a centrifugal separator such that the dome-shaped-surface faces the incoming mixture that is to be separated, such as facing the inlet tube for the inlet liquid. The dome-shaped surface may thus facilitate smooth transition of the flow incoming liquid from a first direction to another direction. Any gas trapped at the inlet may thus enter the dome-shaped valve via a gas inlet that extend from the dome-shaped surface to the cavity within the valve body.

Furthermore, the valve may comprise a further outer surface having fastening means for fastening the valve in a centrifugal separator.

Fastening means may for example be one or several pins for fastening the valve in a centrifugal separator such that the dome-shaped surface faces the inlet. The fastening means may be arranged on a flat, outer surface of the valve body. Thus, the outer surface of the valve, or valve body, may consist of the dome-shaped surface and a flat surface. The flat surface may thus form a base surface from which the dome shaped structure extends. The whole valve may thus be shaped as a hemispherical-like structure.

As a second aspect of the invention, there is provided a centrifugal separator comprising
  a rotor body which is rotatable around an axis of rotation (R) and comprising a separation chamber for separating liquid material;
  an inlet pipe for liquid material to be processed;
  at least one outlet for discharging a heavy phase and at least one liquid light phase outlet for discharging a liquid light phase; and
  a valve according to the first aspect of the invention arranged at the inlet,
  wherein the valve is further arranged such that the central axis of rotation (C) is aligned with the rotational axis (R) of the centrifugal separator and such that gas assembled at the inlet may enter the gas intake of the valve.

A centrifugal separator refers to a separator in which material is separated due to centrifugal forces. Such a separator may comprise a rotor body which is rotatable around an axis of rotation (R). The rotor body comprises a separation chamber for separating e.g. solid particles from a liquid mixture and separating different liquid components depending on their density. The separator has thus an inlet pipe for the material or liquid mixture that is to be separated and at least one outlet for separated liquid and/or solid material. The material that is to be processed is thus transported via an inlet pipe and is discharged at the inlet of the separator. The inlet pipe may thus extend into the inlet, and the inlet may be the part of the separator between the inlet pipe and the separation chamber. The valve being "arranged at the inlet" may thus mean that the valve is arranged within the part of the separator to which the inlet pipe extends. The valve may thus be arranged downstream the inlet pipe but upstream the separation chamber.

The separator may have an outlet for separated solid material and a single outlet for separated liquid, e.g. a liquid light phase outlet. However, the separator may also have an outlet for separated solid material and two outlets for separated liquids, e.g. a first liquid outlet (a liquid light phase outlet) and a second liquid outlet (a liquid heavy phase outlet). The first and second liquid outlets may be located at different radial distances from rotational axis of the separator such that liquids of different densities may be discharged from the liquid outlets. Thus, the separator may have a liquid light phase outlet and a liquid heavy phase outlet, and the liquid heavy phase outlet may be arranged at a radial distance that is larger than the radial distance of the liquid light phase outlet.

The inlet may be located at the top or bottom of the separator, e.g. as close to the rotational axis as possible. As an example, the inlet may be located at the bottom and the liquid light phase outlet or outlets may be located at the top of the separator.

The valve being arranged at the inlet may be the valve being arranged at the distributor, such as on a surface in the centre of the distributor. The distributor guides the incoming liquid to the separation chamber of the separator. Thus, the distributor may guide the incoming feed to distribution holes of the discs in a disc stack arranged in the separation chamber.

The separation chamber may further comprise a stack of separation plates, e.g. frustoconical separation discs, for enhancing the separation efficiency.

For example, the separator may be mechanically hermetically sealed at the inlet.

A centrifugal separator being mechanically hermetically sealed at the inlet refers to a centrifugal separator having a mechanical seal at the inlet. Consequently, the inlet may be a hermetic inlet. A hermetic inlet is sealed from the surroundings of the rotor and is arranged to be filled with fluid product during operation. Thereby the inlet and the separation chamber are connected in a pressure communicating manner. Furthermore, one or several outlets for separated liquid may consequently be hermetic outlets. A hermetic outlet is sealed from the surroundings of the rotor and is arranged to be filled with fluid product during operation. Thus, in contrast to separators having a pairing disc at the liquid outlets, the mechanically hermetically sealed separator has no liquid-air interfaces at the outlets.

Further, the at least one outlet for discharging a heavy phase may comprise discharge ports for discharging accumulated solids and arranged at the periphery of the separation chamber. The centrifugal separator may further comprise discharge port for discharging accumulated solids at the periphery of the separation chamber.

As discussed in relation to the first aspect above, a centrifugal separator having the valve arranged at the inlet is advantageous in that the valve may self-regulate the draining of gas from the inlet. When no gas is present, incoming liquid may fill the cavity such that the valve ball floats on the surface of the liquid and seals the valve seat. When gas is present within the valve, the ball is forced by centrifugal forces in the radial direction from rotational axis X such that the drain passage from the valve seat is open, thereby allowing gas to drain.

The ball being arranged in a cavity within the valve further protects the valve ball from the incoming flow or turbulence from the incoming liquid The valve according to the first aspect of the invention arranged at the inlet may thus be arranged such that it faces the incoming liquid mixture that is to be separated. The valve may thus be arranged downstream from the inlet but upstream from the separation chamber. The valve may be arranged such that it rotates with the rotor body around the rotational axis X, i.e. rotating around the central axis C of the valve.

Consequently, in embodiments of the second aspect of the invention, the valve has a dome shaped outer surface that is facing the inlet pipe for liquid material to be processed.

Thus, the dome-shaped outer surface may be facing the incoming flow of liquid material that is to be processed and thereby smoothly directing the flow towards the separation chamber. The valve may be arranged such that the dome-shaped outer surface aids in directing the flow from a first incoming direction, such as an axial direction, to a direction that is substantially perpendicular to the first direction, such as a radial direction.

Furthermore, the rotational axis (R) may be a vertical axis and the centrifugal separator may be arranged to be fed with liquid material to be processed from the bottom.

Thus, the inlet may be located at the bottom, such that the material or liquid mixture that is to be separated is fed into the separation chamber through a spindle that supports the rotor body. Thus, the separator may be bottom-fed.

Introducing the liquid material from the bottom further provides a gentle acceleration of the liquid.

In embodiments of the first aspect of the invention, the separator further is mechanically hermetically sealed at the inlet and at the liquid outlets.

A centrifugal separator being mechanically hermetically sealed at the inlet and at the liquid outlets refers to a centrifugal separator having a mechanical seal at the inlet and/or the outlet. In a centrifugal separator being hermetically sealed at the inlet and at the liquid outlet, separated liquid phases may be pumped out under pressure, e.g. by means of a built-in pump disc, to at least obtain a required outlet pressure. In order to create a flow of process fluid through such a hermetic separator, an inlet pressure may be provided to overcome the pressure drop in the separator.

In embodiments of the first aspect of the invention, the drain channel of the valve is further coupled to the at least one liquid light phase outlet. Thus, gas may be allowed to drain from the inlet to a liquid outlet. If the separator is bottom fed, the gas may thus be drained from the inlet located at the bottom to a liquid outlet located at the top. As discussed in relation to the first aspect above, the drain channel may comprise a portion that is aligned with the rotational axis. This, the drain channel may extend through the centre of the separator from the inlet to the outlet.

In embodiments of the first aspect, the drain channel of the valve is further coupled to the outside of the separator. Thus, the drain channel may be further coupled to the atmosphere, either via a liquid outlet or directly from the inlet to the atmosphere. The drain channel may be coupled to the atmosphere through a passage in the spindle.

This may ensure that the separation efficiency is good even if the valve should be leaking, and this may be crucial for critical applications. Moreover, if the drain is connected to the outside of the separator, a leak is easily detected.

As a third aspect of the invention, there is provided a method of draining gas from the inlet of a centrifugal separator comprising providing a separator according to the second aspect of the invention, introducing liquid material to be processed via the inlet to the separator, allowing gas accumulated at the inlet to drain from the valve of the separator.

The liquid material could be introduced via the inlet while the separator is running at its operational speed.

The centrifugal separator is a separator as discussed in relation to the second aspect above. Thus the separator may be mechanically hermetically sealed at the inlet and at a liquid light phase outlet. As an example, the centrifugal separator may be operated such that $$\Delta P * A_{valve\ seat} < m_{valve\ ball} * \omega^2 * Z$$

in which $\Delta P$=the pressure difference over the valve seat, may be approximated with the pressure difference between the inlet and a liquid light phase outlet closest to the rotational axis $A_{valve\ seat}$=area of the valve seat $m_{valve\ ball}$=mass of the valve ball $\omega$=rotational speed (rpm)

Z=distance between rotational axis and the mass centre of the valve ball.

This may facilitate that trapped gas is drained from the valve, i.e. that the ball moves in the radial direction within the cavity of the valve.

BRIEF DESCRIPTION OF THE DRAWINGS

FIG. 1a shows a perspective view of a valve according to an embodiment of the invention.

FIG. 1b shows a top view of the valve in FIG. 1a.

FIG. 1c shows a section along line A-A of the valve in FIGS. 1a and 1b.

DETAILED DESCRIPTION

The method and system according to the present disclosure will be further illustrated by the following description of an embodiment with reference to the accompanying drawings.

Figures 1A, 1B, 1C:
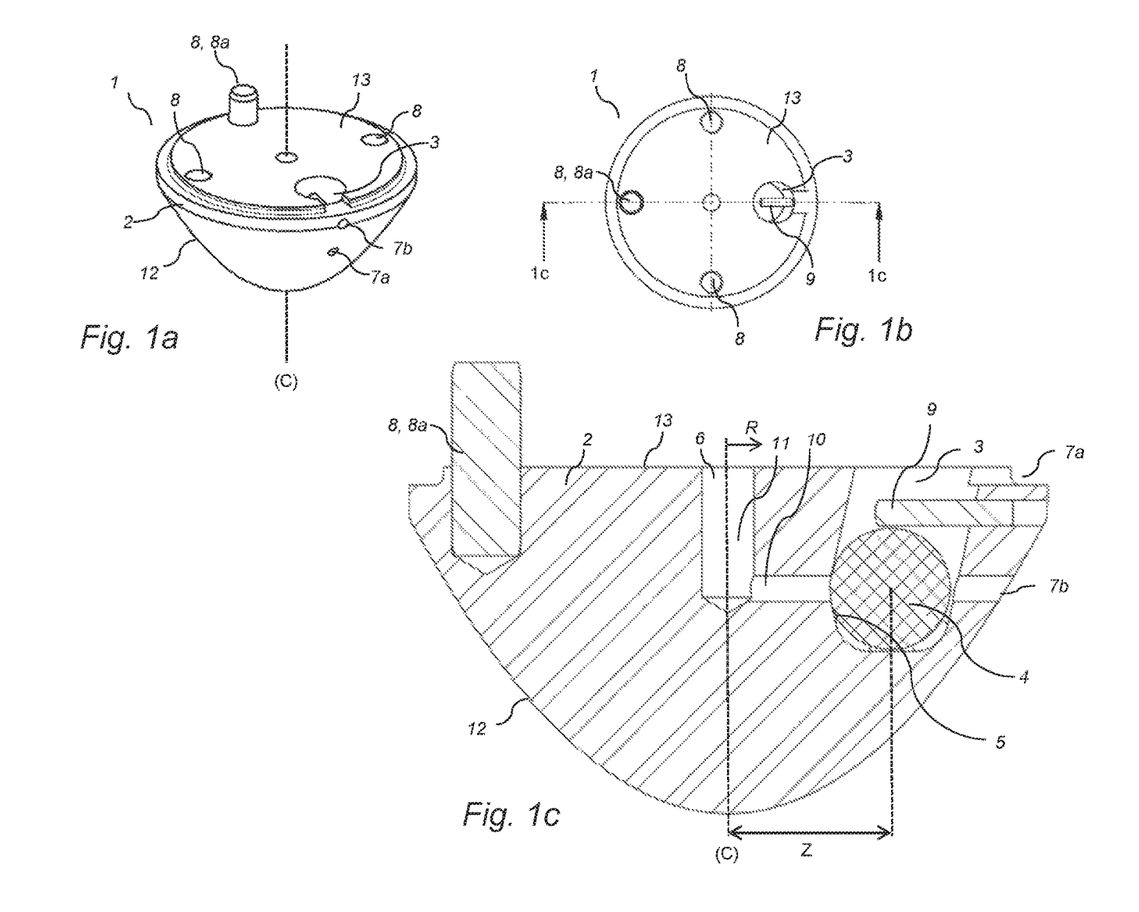

FIGS. 1a-c show a valve 1 according to an embodiment of the invention. FIG. 1a shows a perspective view of the valve 1, whereas FIG. 1b shoes a top view of the valve 1. FIG. 1c shows a section of the valve along line A-A of FIG. 1b.

The valve 1 comprises a valve body 2. The valve body 2 has a dome-shaped outer surface 12 and a flat upper surface 13. The upper surface 13 is arranged for mounting against a surface within a separator. This may be achieved with fastening means 8. The fastening means 8 includes a cylindrical pin 8a. When mounted at the inlet of a separator, the dome-shaped surface 12 is supposed to face the incoming liquid and aid in distributing the liquid smoothly towards a separation space within the separator.

The valve further comprises a central axis C, around which the valve may be rotated. The central axis C cuts through both the dome shaped outer surface 12 and the upper flat surface 13.

Moreover, a cavity 3 is arranged within the valve body 2. The cavity 3 extends from the upper surface 13 down into the valve body. In this case, the cavity 3 extends about halfway down into the valve body 2. The cavity 3 is further arranged at a radial distance from central axis C, such that the whole cavity is at a radial distance from central axis C. Thus, central axis C does not extend through the cavity in this example.

Within cavity 3, a valve ball 4 is arranged. The width D of cavity 3 is larger than the diameter of the valve ball 4, meaning that valve ball 4 may move in the radial direction within the cavity 3. A holding means 9 in the form of a cylindrical pin extend from the inner surface of the cavity 3 above the valve ball 4. The cylindrical pin retains the valve ball 4 within the cavity and restricts the possible movements of the valve ball within the cavity 3, meaning that the valve ball may substantially only move forward and backward in the radial direction R from central axis C.

The diameter of the valve ball 4 is only slightly smaller than the diameter D of the cavity 3. This means that the distance the valve ball may move in the radial direction R is very small compared to the diameter of the ball. For example, the distance the valve ball 4 may move in the radial direction within the cavity may be about 1-10% of the diameter of the ball, such as about 5% of the diameter of the ball.

There are two gas intake channels 7a, 7b, extending from the outer dome-shaped surface to the cavity. A first gas intake channel 7a is located at the top of the cavity, above the retaining pin 9. In this case, the first air intake channel has no "roof", i.e. it is a recess in the upper surface 13 of the valve body 2 that extends from the cavity in the radial direction to the periphery. When the valve 1 is mounted such that the upper surface 13 is pressed against an inner surface of a separator, that inner surface forms the "roof" of the first gas intake channel 7a. The second gas intake channel 7b is located below the first gas intake channel 7a. The second gas intake channel 7b is located at a position substantially at the centre of the valve ball 4 when the valve ball 4 is retained in the cavity 3. In other embodiments, the valve only contains a single gas intake channel. This may for example be either the first 7a or the second gas intake channel 7b.

Near the bottom of the cavity 3, a valve seat 5 is located. The valve seat 5 forms the entrance of the drain channel 6 for air and gas. The valve seat 5 is located at a position substantially at the centre of the valve ball 4 when the valve ball 4 is retained in the cavity 3. The valve seat 5 is round-shaped and has a diameter that is smaller than the diameter of the valve ball 4 such that the valve ball 4 and the valve seat 5 may form an air-tight fit when the valve ball 4 is pressed against the valve seat 5. The valve seat 5 is located at the inner surface of the cavity 3 that is closest to central axis C. The valve seat is thus located at the inner surface of the cavity opposite the gas intake channels 7a, 7b. This means that the valve ball 4 is pressed against the valve seat 5 when the valve ball is at its shortest possible radial distance from central axis C.

The drain channel comprises a first channel portion 10 that extends from the valve seat substantially in the radial direction toward central axis C. Thus, the second gas intake-channel 7b and the first portion 10 of the drain channel may extend in the same direction. The first portion 10 of the drain channel may be an extension of the second gas intake channel 7b, i.e. channel 7b may aid when forming the first drain channel portion 10.

The drain channel further comprises a second portion 11 that extends from the first channel portion along the central axis c. In this case, the second channel portion 10 extends from the centre of the valve body 2 along the central axis C and out from the centre of the upper surface 13.

The distance Z from the mass centre of the valve ball 4 and central axis C (and the rotational axis X when the valve is arranged in a separator) is further discussed in relation to FIG. 5 below.

Figure 2A:
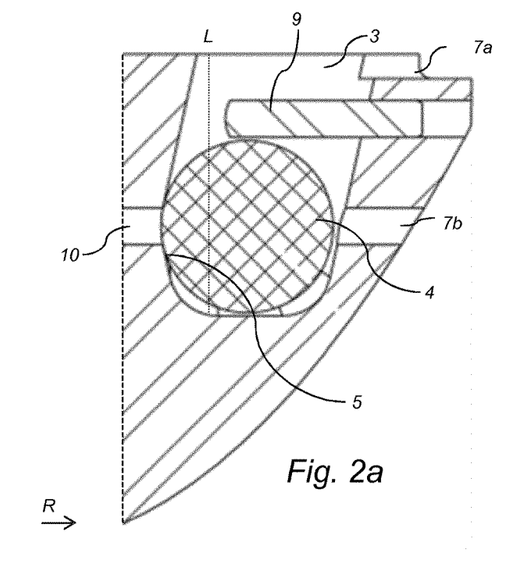
FIG. 2a shows a close-up view of the valve when the valve is in a closed position.
Figure 2B:
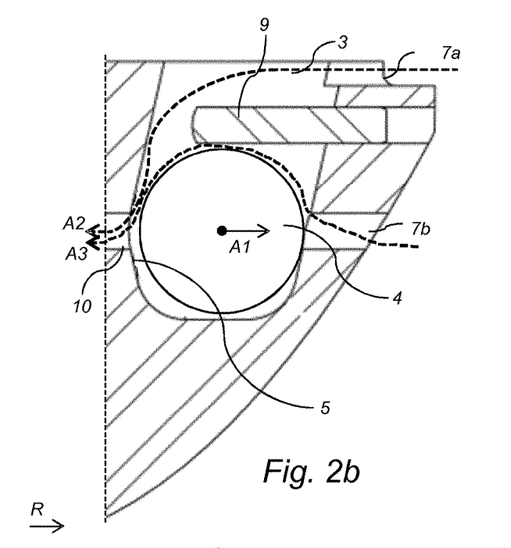
FIG. 2b shows a close-up view of the valve when the valve is in an open position.

FIGS. 2a and 2b show the valve-function of the valve 1 when the valve 1 is arranged within a centrifugal separator.

FIG. 2a shows the valve 1 in a closed position, i.e. when there is little or no air present around the dome. During operation and rotation of the valve 1, incoming liquid fills at least part of the cavity 3 via the gas intake channels 7a and 7b. The liquid surface during rotation of the valve is depicted with line L. The valve ball 4, being of an elastic material having a density lower than the density of the incoming liquid, floats on the surface L of the liquid and is pressed against the valve seat 5, thereby blocking any liquid or gas from entering the first drain channel portion 10. Due to the buoyancy of the valve ball 4, a tight fit is formed between the valve ball 4 and the valve seat 5.

FIG. 2b shows the valve 1 in an open position. When the amount of gas increases around the valve 1 and the liquid level is shifted radially outwards, the centrifugal forces will act on the valve ball 4 and force the ball in the radial direction R away from the valve seat 5, as depicted by arrow A1. Due to the weight of the valve ball, an axial gravitational force (acting "downwards") is also influencing the valve ball. However, at an rotational speed of about 4000 rpm and a distance of 20 mm from the rotational axis and the mass centre of the ball (distance Z in FIG. 1c), this force is about 360 times smaller compared to the force driving the valve ball in the radial direction, i.e. such force may be neglected.

Thereby, a small passage may be formed between the valve ball 4 and the valve seat 5. Gas entering the gas intake channels 7a and 7b may then be drained from the valve 1 via the drain channel 6, by entering the first channel portion 10. This is depicted by arrows A2 and A3 in FIG. 2b. As the excess gas has been released, liquid may yet again enter the cavity 3 and the valve ball 4, floating on the surface of this liquid, will move back in the radial direction and close the valve by pressing against the valve seat 5.

Figure 3:
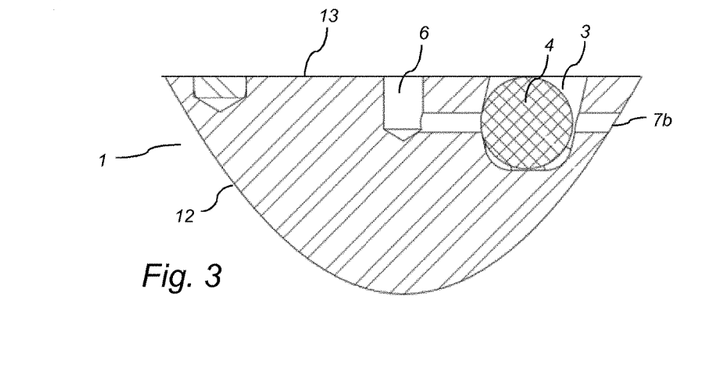
FIG. 3 shows an alternative embodiment of the valve.

FIG. 3 shows an alternative embodiment of a valve 1 according to the present disclosure. The valve function as the valve described in FIGS. 1 and 2, but the cavity 3 is not as deep as the cavity of the valve of FIGS. 1 and 2. In this way, the retaining means 9 shown in FIGS. 1 and 2 may be obsolete. Instead, the surface onto which the valve is arranged, i.e. the surface onto which the upper flat surface 13 of the valve 1 is pressed when the valve is arranged in a separator, functions as a means to retain the valve ball 4 within the cavity 3. Further, in this embodiment, the valve 1 only contains a single gas-intake 7b.

Figure 4:
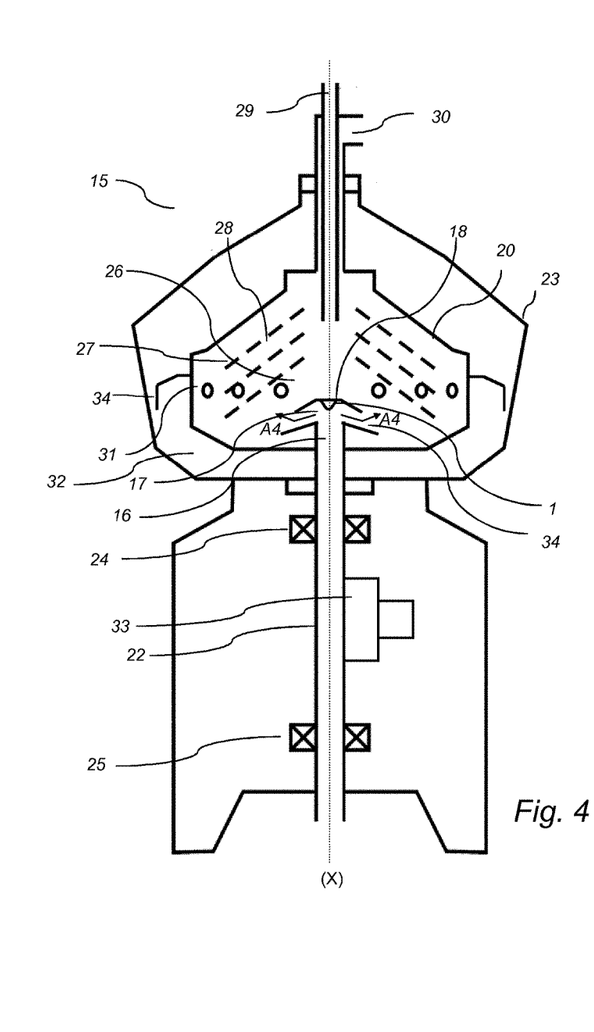
FIG. 4 shows a centrifugal separator comprising a valve according to the invention.

A schematic example of a centrifugal separator 15 according to the invention is shown in FIG. 4.

The centrifugal separator 15 comprises a rotor 20 arranged for rotation about an axis of rotation (X) by means of a spindle 22. The spindle 22 is supported in the casing 23 of the centrifugal separator in a bottom bearing 24 and a top bearing 25. The rotor 20 forms within itself a separation chamber 26 in which centrifugal separation of a liquid material to takes place during operation. The centrifugal separator 15 is of a so called hermetic type with a closed separation space 26, i.e. the separation space 26 is intended to be completely filled with liquid during operation. In principle, this means that preferably no air or free liquid surfaces is meant to be present within the rotor.

The separation space 26 is provided with a stack of frusto-conical separation discs 27 in order to achieve effective separation of the liquid. The stack of truncated conical separation discs 27 are examples of surface-enlarging inserts. These discs 27 are fitted centrally and coaxially with the rotor and comprise holes which form channels 28 for axial flow of liquid when the separation discs 27 are fitted in the centrifugal separator 15.

An inlet channel 16 for introducing the liquid for centrifugal separation extends into the inlet 17 of the rotor, providing the material to be separated to the separation space 26. The inlet channel 16 extends through the spindle 22, which takes the form of a hollow, tubular member. The inlet 17 of the separator is thus the space into which the inlet channel 16 extends. Introducing the liquid material from the bottom provides a gentle acceleration of the liquid. The inlet channel 16 is further connected to inlet pipes (not shown) at the bottom of the separator in which pipes the liquid material to be separated is transported by means of e.g. a pump.

A valve 1 is arranged on a surface 18 at the inlet 17 of the separator such that the dome-shaped surface is facing the inlet channel 16. The arrangement of the valve 1 within the separator is further described in relation to FIG. 5 below.

The rotor has extending from it a liquid light phase outlet 29 for a lower density component separated from the liquid, and a liquid heavy phase outlet 30 for a higher density component, or heavy phase, separated from the liquid. The outlets 29 and 30 extend through the casing 23. The rotor is provided at its outer periphery with a set of radially sludge outlets 31 in the form of intermittently openable outlets for discharge of e.g. higher density component such as sludge or other solids in the liquid. This material is thus discharged from a radially outer portion of the separation chamber 26 to the space 32 round the rotor.

The centrifugal separator 15 is further provided with a drive motor 33. This motor 30 may for example comprise a stationary element and a rotatable element, which rotatable element surrounds and is so connected to the spindle 22 that during operation it transmits driving torque to the spindle 22 and hence to the rotor 20. The drive motor may be an electric motor. Furthermore, the drive motor 33 may be connected to the spindle 22 by transmission means. The transmission means may be in the form of a worm gear which comprises a pinion and an element connected to the spindle in order to receive driving torque. The transmission means may alternatively take the form of a propeller shaft, drive belts or the like, and the drive motor may alternatively be connected directly to the spindle.

The centrifugal separator further comprises deflector means 34 adapted to deflect discharged sludge or solids downwards to the bottom of the frame, which may further be connected to a discharge device in the form of a sludge pump (not shown) for discharge of sludge.

During operation of the separator in FIG. 4, the rotor 20 is caused to rotate by torque transmitted from the drive motor 33 to the spindle 22. Via the inlet channel 16, liquid material to be separated is brought into the separation space 26 via passages 34, as indicated by arrows A4. The dome-shaped valve 1 aids in smoothly deflecting the incoming liquid from the inlet channel 16 to passages 34. In the hermetic type of inlet the acceleration of the liquid material is initiated at a small radius and is gradually increased while the liquid leaves the inlet and enters the separation space 26. However, liquid may also be introduced when the rotor is already running at its operational speed. Liquid material may thus be continuously introduced into the rotor 20.

Depending on the density, different phases in the liquid is separated between the separation discs 27 fitted in the separation space 26. Heavier components in the liquid move radially outwards between the separation discs, whereas the phase of lowest density moves radially inwards between the separation discs and is forced through outlet 29 arranged at the radial innermost level in the separator. The liquid of higher density is instead forced out through outlet 30 that is at a radial distance that is larger than the radial level of outlet 29. Thus, during separation, an interphase between the liquid of lower density and the liquid of higher density is formed in the separation space 26. The radial level, i.e. the distance from rotation al axis X, of this interface level is in the hermetic separator determined by the counter pressure of outlets 29 and 30 of the separator. Solids accumulate within the sludge phase outlets 31. Sludge is emptied intermittently from the separation space by the sludge outlets 31 being opened, whereupon sludge and a certain amount of fluid is discharged from the separation space by means of centrifugal force. The discharge of sludge may also take place continuously, in which case the sludge outlets 31 take the form of open nozzles and a certain flow of sludge and/or heavy phase is discharged continuously by means of centrifugal force. Sludge which is discharged from the separation space via the sludge outlets is conveyed downwards by deflecting means 34 and accumulated sludge may then be pumped out by a sludge pump.

However, in certain applications, the separator 15 only contains a single liquid outlet, such as only liquid outlet 29, and the sludge outlets 31. This depends on the liquid material that is to be processed.

Figure 5:
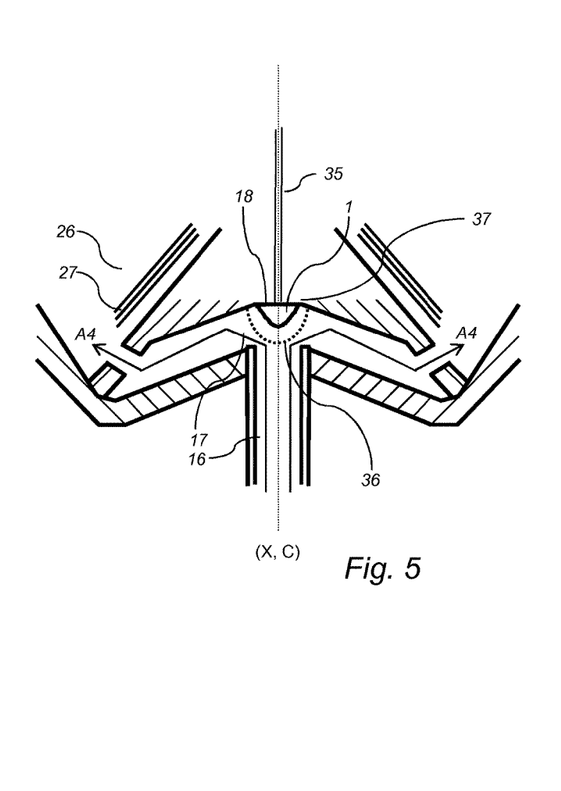
FIG. 5 shows a close-up view of the valve arranged in the separator of FIG. 4.

FIG. 5 further shows a close-up view of the valve 1 when arranged at the inlet 17 of the separator 15. The valve 1 is arranged on the surface 18, which is the surface at the centre of the distributor 37 where the feed enters the rotor.

As shown in FIG. 5, the valve 1 is arranged such that the rotational axis C of the valve 1 is aligned with the rotational axis X of the separator 15. Liquid introduced from inlet channel 16 in the spindle is gently guided to separation chamber 26 through passages 34, as shown by arrows A4. The dome-shaped outer surface of the valve 1 aids in the smooth transition of the liquid from the inlet channel 16 to the separation space 26. FIG. 5 further shows a potential accumulation of gas 36 at the centre of the rotating inlet 17. The gas having a low density is not transported radially in the strong gravitational field but instead remains at the centre, thereby obstructing the incoming flow of liquid. Thus, the valve 1 has the capacity of draining such gas accumulated at the inlet 17. In this case, the drain channel of the valve 1 is connected to internal drain passage 35 of the separator 15. The internal drain passage 35 runs axially along the rotational axis X and terminates at the liquid light phase outlet 29. Thus, the gas is drained from the separator together with the separated liquid of low density.

The centrifugal separator may operate at a speed and the operational parameters may be such that $$\Delta P * A_{valve\ seat} < m_{valve\ ball} * \omega^2 * Z$$

in which
$\Delta P$=the pressure difference between the inlet and liquid light phase outlet
$A_{valve\ seat}$=area of the valve seat
$m_{valve\ ball}$=mass of the valve ball
$\omega$=rotational speed (rpm)
Z=distance between rotational axis and the mass centre of the valve ball.

This may facilitate that trapped gas is drained from the valve 1, i.e. that the ball moves in the radial direction within the cavity of the valve.

The invention is not limited to the embodiment disclosed but may be varied and modified within the scope of the claims set out below. The invention is not limited to the orientation of the axis of rotation X disclosed in the figures. The term "centrifugal separator" also comprises centrifugal separators with a substantially horizontally oriented axis of rotation.

The invention claimed is:

1. A valve for draining off gas from a centrifugal separator, said valve comprising:
   a valve body having a central axis around which said valve may be rotated;
   a cavity arranged at a radial distance from said central axis and comprising a valve ball and a valve seat;
   at least one drain channel extending from said valve seat of the cavity to an outside of said valve body; and
   at least one gas intake extending from the outside of said valve body to said cavity,
   wherein said valve ball is in a relaxed state within said cavity and is arranged to float on a liquid surface present within the cavity, and the valve ball is movable in said cavity in the radial direction from the central axis from a closed position, in which the hall rests against the valve seat and blocks gas in the cavity from entering said at least one drain channel, to an open position, in which the valve ball is at a longer radial distance from the central axis compared to the closed position, and in which open position said valve ball does not block said valve seat and allows gas in said cavity to drain from said valve via said drain channel.

2. The valve according to claim 1, wherein the valve ball is made of a material that is capable of floating on the surface of an aqueous liquid.

3. The valve according to claim 2, wherein said second portion is substantially aligned with said central axis of said valve body.

4. The valve according to claim 3, further comprising a holder configured to retain said ball within said cavity.

5. The valve according to claim 2, wherein the valve ball is made of an elastic material.

6. The valve according to claim 2, further comprising a holder configured to retain said ball within said cavity.

7. The valve according to claim 1, wherein the valve ball is made of an elastic material.

8. The valve according to claim 7, further comprising a holder configured to retain said ball within said cavity.

9. The valve according to claim 1, wherein said drain channel comprises a first channel portion extending substantially in the radial direction from central axis from said valve seat, and a second channel portion extending from said first channel portion to the outside of the valve body.

10. The valve according to claim 9, further comprising a holder configured to retain said ball within said cavity.

11. The valve according to claim 1, further comprising a holder configured to retain said ball within said cavity.

12. The valve according to claim 1, wherein the valve comprises a dome-shaped outer surface, and said at least one fluid intake extends from said dome-shaped outer surface to said cavity.

13. The valve according to claim 12, wherein said valve comprises a further outer surface having a fastener configured to fasten the valve in a centrifugal separator.

14. A centrifugal separator comprising:
- a rotor body which is rotatable around an axis of rotation and comprising a separation chamber for separating liquid material;
- an inlet pipe for liquid material to be processed;
- at least one outlet for discharging a heavy phase and at least one liquid light phase outlet for discharging a liquid light phase; and
- the valve according to claim 1 arranged at the inlet,
- wherein the valve is further arranged such that the central axis of rotation is aligned with the rotational axis of the centrifugal separator and such that gas assembled at the inlet may enter said gas intake of the valve.

15. The centrifugal separator according to claim 14, wherein the valve has a dome shaped outer surface that is facing said inlet pipe for liquid material to be processed.

16. The centrifugal separator according to claim 14, wherein the rotational axis is a vertical axis and said centrifugal separator is arranged to be fed with liquid material to be processed from the bottom.

17. The centrifugal separator according to claim 14, wherein said separator further is mechanically hermetically sealed at the inlet and at the liquid outlets.

18. The centrifugal separator according to claim 14, wherein the drain channel of said valve is further coupled to said at least one liquid light phase outlet.

19. The centrifugal separator according to claim 14, wherein the drain channel of said valve is further coupled to the outside of the separator.

20. A method of draining gas from the inlet of a centrifugal separator comprising the steps of:
- providing the separator according to claim 14;
- introducing liquid material to be processed via the inlet to the separator; and
- allowing gas accumulated at the inlet to drain from said valve of the separator.

* * * * *